US011363103B2

United States Patent
Afzal et al.

(10) Patent No.: US 11,363,103 B2
(45) Date of Patent: Jun. 14, 2022

(54) DYNAMIC USER PLANE FUNCTION (UPF) SELECTION BASED ON SUPPORTED PROTOCOL TYPE

(71) Applicant: T-Mobile USA, Inc., Bellevue, WA (US)

(72) Inventors: Muhammad W. Afzal, Bellevue, WA (US); Suliman Albasheir, Sammamish, WA (US); Suresh Thanneeru, Bothell, WA (US); Rahul Pal, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 60 days.

(21) Appl. No.: 16/940,344

(22) Filed: Jul. 27, 2020

(65) Prior Publication Data

US 2022/0030071 A1 Jan. 27, 2022

(51) Int. Cl.
*H04L 29/08* (2006.01)
*H04L 67/141* (2022.01)
*H04W 80/04* (2009.01)

(52) U.S. Cl.
CPC ......... *H04L 67/141* (2013.01); *H04W 80/045* (2013.01)

(58) Field of Classification Search
CPC ............................ H04L 67/141; H04W 80/045
See application file for complete search history.

(56) References Cited

U.S. PATENT DOCUMENTS

| 2018/0270715 A1* | 9/2018 | Lee | H04W 36/0011 |
| 2019/0007500 A1* | 1/2019 | Kim | H04L 67/141 |
| 2019/0059067 A1* | 2/2019 | Lee | H04L 47/821 |
| 2019/0116229 A1* | 4/2019 | Shi | H04L 67/141 |
| 2019/0158408 A1* | 5/2019 | Li | H04L 67/104 |
| 2019/0254118 A1* | 8/2019 | Dao | H04L 12/1407 |
| 2019/0306251 A1* | 10/2019 | Talebi Fard | H04L 67/12 |
| 2020/0228936 A1* | 7/2020 | Talebi Fard | H04W 8/186 |

(Continued)

OTHER PUBLICATIONS

ETSI TS 123 502 V15.2.0; 5G; Procedures for the 5G System; (3GPP TS 23.502 version 15.2.0 Release 15) https://www.etsi.org/deliver/etsi_ts/123500_123599/123502/15.02.00_60/ts_123502v150200p.pdf (Year: 2018).*

(Continued)

*Primary Examiner* — Kostas J Katsikis

(57) ABSTRACT

A solution for establishing a data traffic (e.g., PDU) session for a user equipment (UE) on a network (e.g., 5G cellular network) comprises receiving, by a session management node, a request for the data traffic session for the UE; determining a requested traffic type for the data traffic session, wherein the requested traffic type comprises a first traffic type or a second traffic type; determining whether the session management node is connected to a first user plane function that can support the requested traffic type; based at least on determining that the first user plane function cannot support the requested traffic type, connecting, by the session management node, to a second user plane function that can support the requested traffic type; and based at least on connecting to the second user plane function, establishing the requested data traffic session for the UE using the second user plane function.

20 Claims, 5 Drawing Sheets

(56) References Cited

U.S. PATENT DOCUMENTS

2020/0259896 A1* 8/2020 Sachs ................ H04W 56/0065
2020/0374352 A1* 11/2020 Ge ........................ H04W 76/11

OTHER PUBLICATIONS

3GPP TS 23.501 V15.5.0; 3rd Generation Partnership Project; Technical Specification Group Services and System Aspects; System Architecture for the 5G System; Stage 2 (Release 15) https://www.ramonmillan.com/documentos/bibliografia/3GPPTS23.5015GSystemArchitectureR15.5.pdf (Year: 2019).*

* cited by examiner

DYNAMIC USER PLANE FUNCTION (UPF) SELECTION BASED ON SUPPORTED PROTOCOL TYPE

BACKGROUND

A user equipment (UE, e.g., a cellphone) may support one of a plurality of different internet protocol (IP) types, for example IP version 4 (IPv4) or IP version 6 (IPv6). On some networks (e.g., 5G cellular networks), not all 5G Session Management Function (SMF) nodes can support both IPv4 and IPv6, although this may be derivative capability limitation, based on the user plane function (UPF) to which the SMF is connected.

When the 5G Core Access and Mobility Management Function (AMF) node is attempting to set up a Protocol Data Unit (PDU) session for a UE, the AMF selects an SMF and informs that selected SMF of the IP type (e.g., IPv4 or IP v6). Unfortunately, if the UE had been requesting a PDU session type for a different IP type than the SMF can accommodate, the SMF will reject the connection. The AMF then selects another SMF, going down its list of available SMFs until it finds (by trial-and-error) an SMF that can support the requested IP type—or the retry limit is exhausted, at which time the session setup fails.

SUMMARY

The following summary is provided to illustrate examples disclosed herein, but is not meant to limit all examples to any particular configuration or sequence of operations.

A solution for establishing a data traffic session (e.g., a protocol data unit (PDU) session) for a user equipment (UE) on a network (e.g., 5G cellular network) comprises receiving, by a session management node, from an access node, a request for the data traffic session for the UE; determining, by the session management node, a requested traffic type for the data traffic session, wherein the requested traffic type comprises a first traffic type or a second traffic type; determining whether the session management node is connected to a first user plane function that can support the requested traffic type; based at least on determining that the first user plane function can support the requested traffic type, establishing the requested data traffic session for the UE using the first user plane function; based at least on determining that the first user plane function cannot support the requested traffic type, connecting, by the session management node, to a second user plane function that can support the requested traffic type; and based at least on connecting to the second user plane function, establishing the requested data traffic session for the UE using the second user plane function.

BRIEF DESCRIPTION OF THE DRAWINGS

The disclosed examples are described below with reference to the accompanying drawing figures listed below, wherein.

Figure 1:
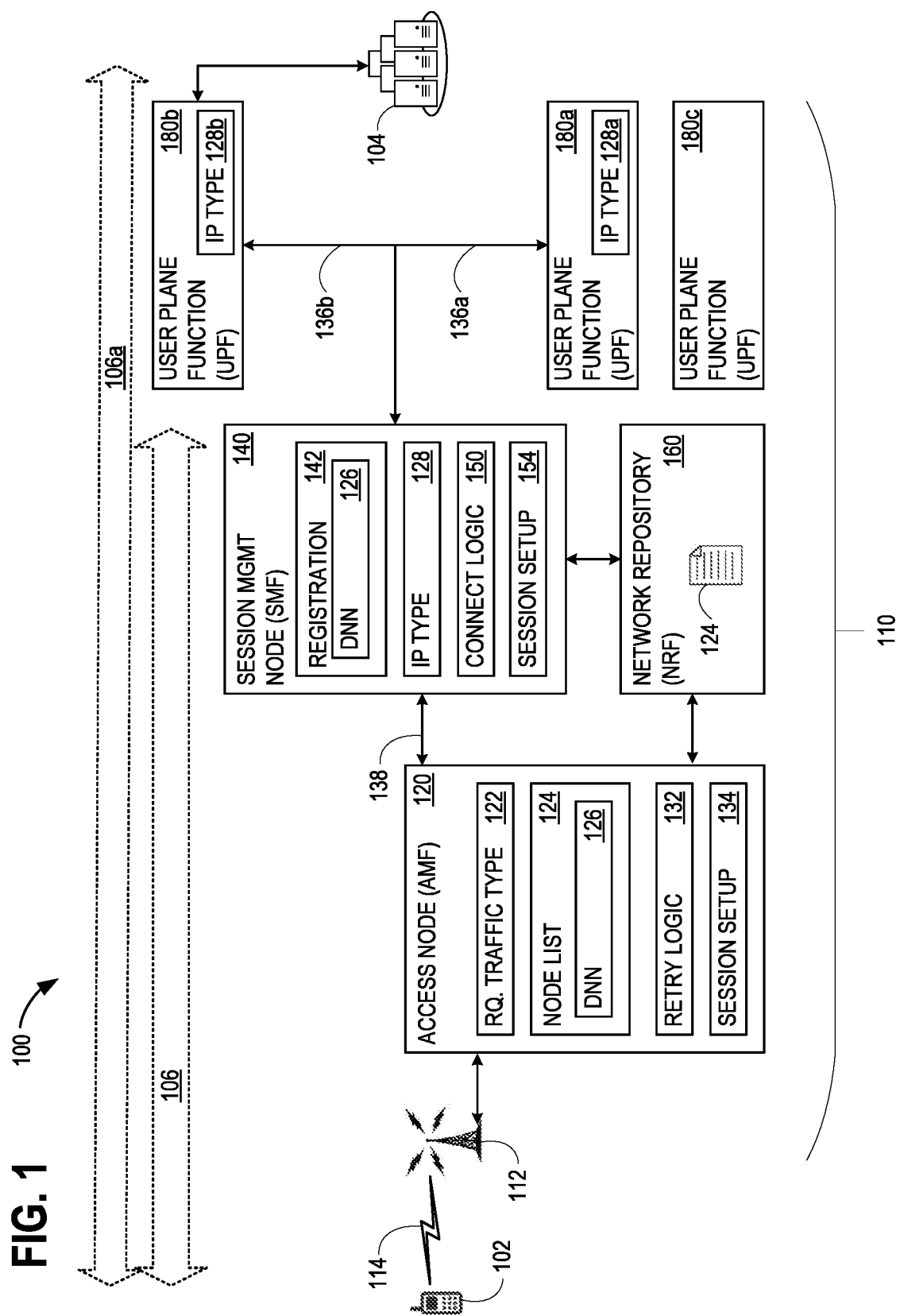
FIG. 1 illustrates an exemplary arrangement that may advantageously establish a data traffic session for a user equipment (UE) on a network, using dynamic user plane function (UPF) selection based on supported protocol type.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for establishing a data traffic session (e.g., a protocol data unit (PDU) session) for a user equipment (UE) on a network (e.g., 5G cellular network) comprises receiving, by a session management node, from an access node, a request for the data traffic session for the UE; determining, by the session management node, a requested traffic type for the data traffic session, wherein the requested traffic type comprises a first traffic type or a second traffic type; determining whether the session management node is connected to a first user plane function (UPF) that can support the requested traffic type; based at least on determining that the first user plane function can support the requested traffic type, establishing the requested data traffic session for the UE using the first user plane function; based at least on determining that the first user plane function cannot support the requested traffic type, connecting, by the session management node, to a second user plane function that can support the requested traffic type; and based at least on connecting to the second user plane function, establishing the requested data traffic session for the UE using the second user plane function.

Aspects of the disclosure improve the speed, reliability, and cost efficiency of network operations by a session management node connecting to a second user plane function that can support the requested traffic type based at least on determining that a first user plane function cannot support the requested traffic type. This advantageous operation precludes the scenario in which an access node wastes time attempting to establish a data traffic session with a session management node that cannot support the requested traffic type, resulting in a rejection of the request by the session management node. This advantageous operation also precludes the scenario in which the access node expends its retry count or reaches a time-out by attempting to establish data traffic sessions with a succession of session management nodes that cannot support the requested traffic type. This advantageous operation further precludes the expense of ensuring that all session management nodes necessarily support all potentially requested traffic types. Thus, the speed, reliability, and cost efficiency of network operations are improved.

With reference now to the figures, FIG. 1 illustrates an exemplary arrangement 100 that may advantageously establish a data traffic session 106 for a UE 102 on a network 110 (e.g., a cellular network), using dynamic user plane functionality (UPF) selection based on supported protocol type. In arrangement 100, UE 102 is attempting to establish data traffic session 106 (e.g., a PDU session, such as internet traffic) with a packet data network (PDN) 104, for example to send or receive email, stream audio or video, visit a website, or send or receive digital files. Establishing data traffic session 106 is a part of establishing a data traffic session 106*a* between UE 102 and PDN 104. As illustrated, data traffic session 106 is a portion of data traffic session 106*a*; data traffic session 106*a* extends beyond network 110 to reach PDN 104.

Network 110 may be a fifth generation (5G) network or another type of network and includes a radio access network (RAN) 112, an access node 120, a network repository 160, a session management node 140, and a plurality of UPF nodes: a first user plane function 180*a* and a second user plane function 180*b*. UE 102 communicates with RAN 112 over an air interface 114. In some examples, access node 120 comprises an access and mobility management function (AMF), network repository 160 comprises a network function repository function (NRF) node, session management node 140 comprises a session management function (SMF) node.

A 5G network has a service-based architecture (SBA), whereby the control plane functionality and common data repositories are delivered by way of a set of interconnected network functions (NFs), each with authorization to access each other's services. An AMF node performs the role of access point to a 5G core, thereby terminating the RAN control plane and receiving connection and session related information from a UE. An SMF is primarily responsible for interacting with the decoupled data plane, creating updating and removing PDU sessions and managing session context with a UPF. A UPF performs packet routing and forwarding. An NRF (NF Repository Function) serves as a repository of the 5G services and also supports discovery mechanisms that allow 5G elements to discover each other and obtain updated status of other elements. Establishing a data traffic session (e.g., a PDU session) may set up a default bearer connection with between a UE and a PDN.

Figure 2:
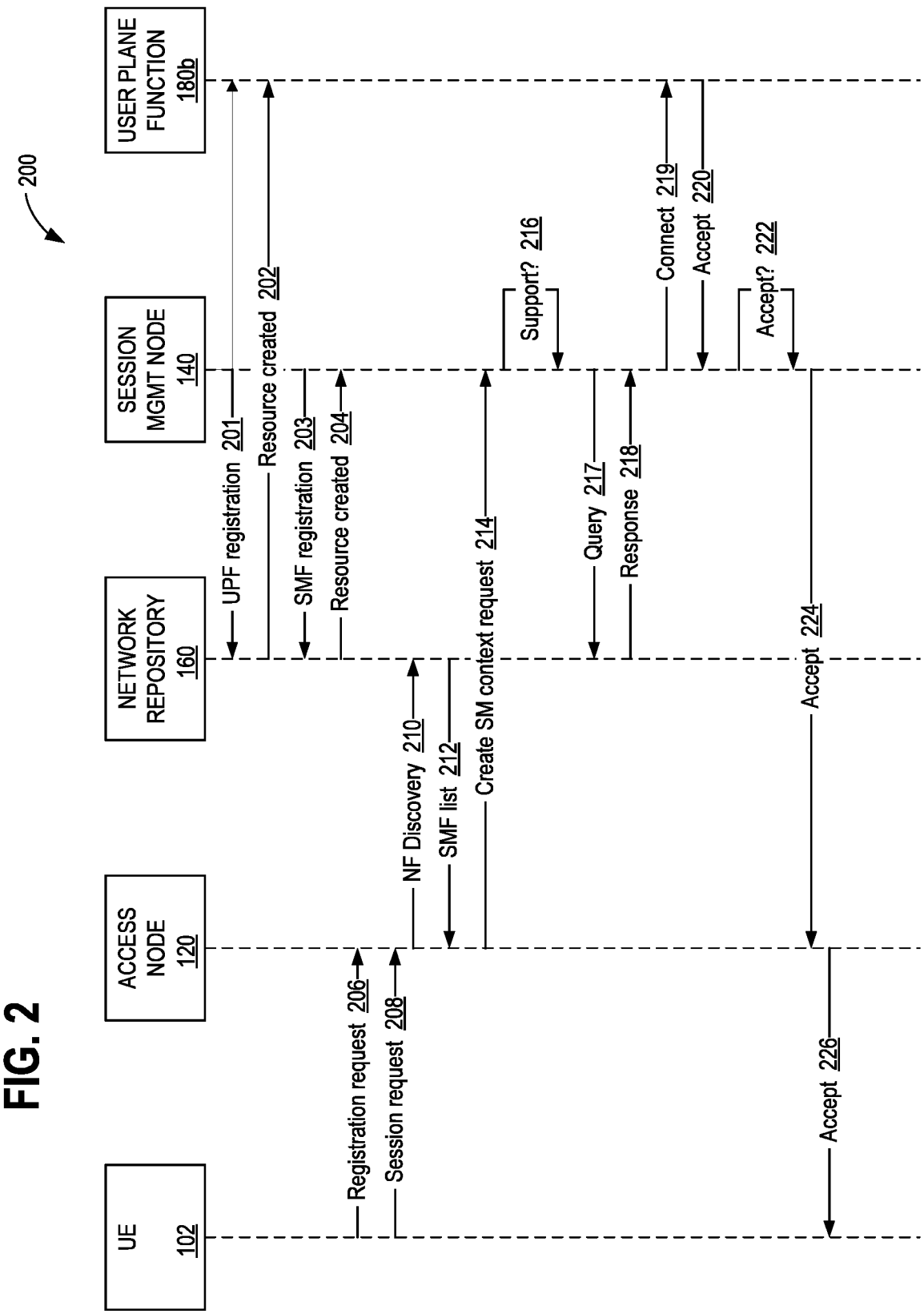
FIG. 2 illustrates a messaging sequence that may be used within the arrangement of FIG. 1.
Figure 3:
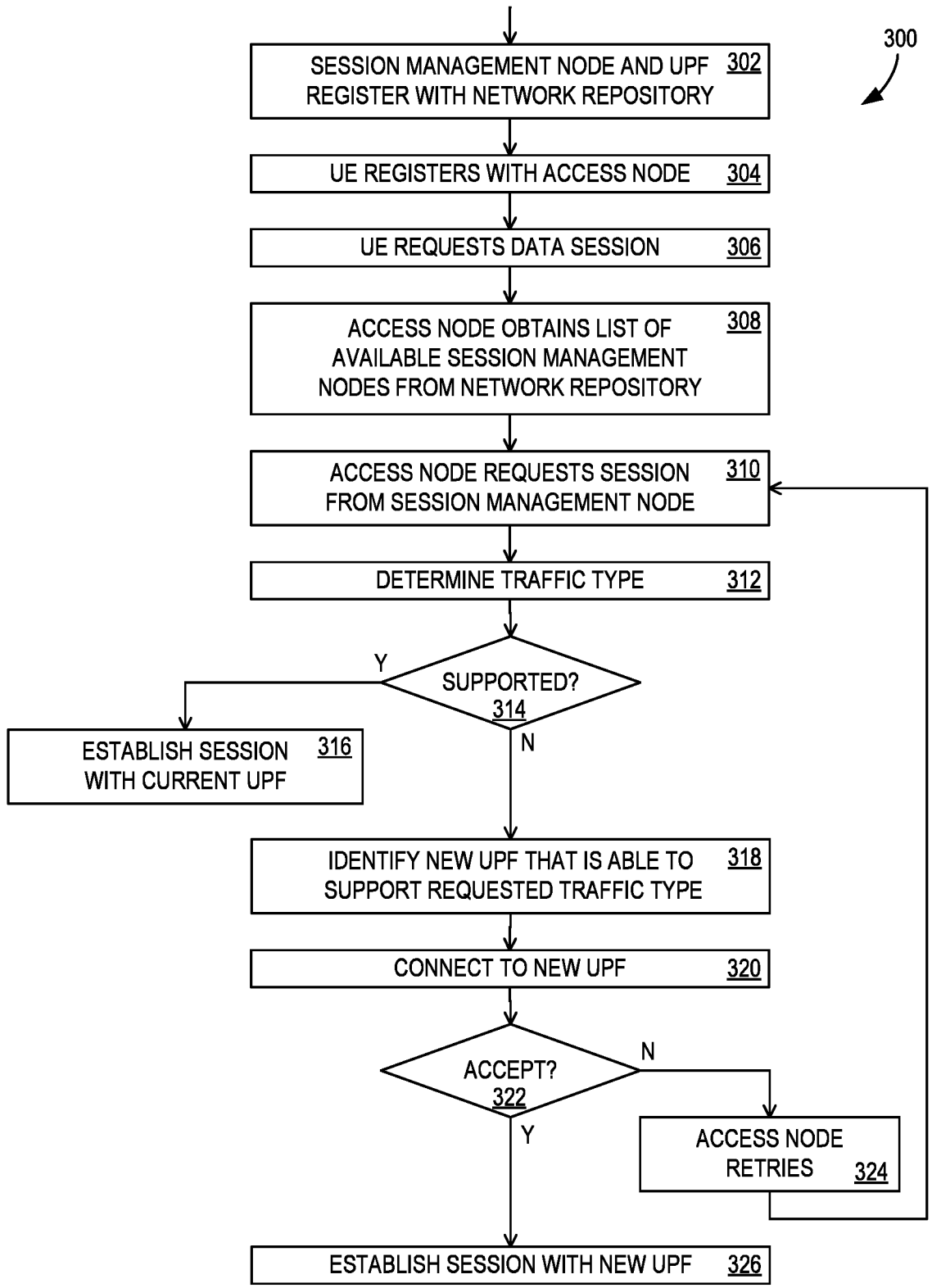
FIG. 3 illustrates a flow chart of exemplary operations associated with establishing a data traffic session for a UE on a network that advantageously employs dynamic UPF selection based on supported protocol type.

Further description of FIG. 1 will be made with additional reference to FIGS. 2 and 3. FIG. 2 is a messaging sequence diagram 200 that shows a series of messages that may be used within arrangement 100, and is described in conjunction with FIG. 3. FIG. 3 illustrates a flow chart 300 of exemplary operations associated with establishing data traffic session 106 for UE 102 on network 110. The messages of messaging sequence diagram 200 occur during various operations of flow chart 300. In some examples, at least a portion of messaging sequence diagram 200 and at least a portion of flow chart 300 may be performed using one or more computing devices 500 of FIG. 5. FIGS. 1-3 should be viewed together.

At operation 302 (FIG. 3), user plane function 180*b* sends a registration request message 201 (FIG. 2) to network repository 160, which responds with a resource created message 202. As part of message 201, user plane function 180*b* identifies its supported IP types (e.g., IPv4, IPv6, or IPv4v6). Also, session management node 140 sends a registration request message 203 to network repository 160, which responds with a resource created message 204. In some examples, messages 202 and 204 each comprises an HTTP 201 created success status response code. When registering with network repository 160 (using message 203), session management node 140 sends registration information 142. Registration information 142 includes a data network name (DNN) 126, which may be in the form of an access point name (APN), and that enables other nodes (including UE 102) to locate session management node 140 on network 110. Operation 302 thus includes registering, by the session management node, with the network repository. Network repository 160 compiles the received registration information, including DNN 126 for session management node 140 and DNNs for other session management nodes, and places the information into a session management node list 124.

Operation 304 includes registering, by UE 102, with access node 120. For example, UE 102 sends a registration request message 206 to access node 120, and since access node 120 performs the role of access point, message 206 acts to register UE 102 with network 110. At 306, UE 102 sends a session establishment request message 208 to access node 120, which identifies a requested traffic type 122. Operation 306 also includes receiving, by access node 120, from UE 102, a request (message 208) for data traffic session 106. In some examples, the request for data traffic session 106 from UE 102 identifies the requested traffic type 122. In some examples, access node 120 determines requested traffic type 122 another way, such as from registration request message 206. In some examples, data traffic session 106 comprises a PDU session. In some examples, the request for data traffic session 106 (message 208) comprises a PDU Session Establishment Request. In some examples, message 208 includes a PDU session type field. In some examples, authorized PDU session type field values include IPv4, IPv6, IPv4v6 (indicating either IPv4 or IPv6), Unstructured, and Ethernet.

At 308, access node sends an NF discovery message 210 to network repository 160, and network repository 160 provides the information of the available NF instances (session management nodes 140*a*-140*c*) as session management node list 124 in message 212. Operation 308 includes receiving, by access node 120, from network repository 160, identification (session management node list 124) of session management nodes 140. In this manner, access node 120 node obtains a list of available session management nodes (including session management node 140) from network repository 160. Operation 310 includes requesting, by access node 120, from session management node 140, data traffic session 106 for UE 102 and receiving, by session management node 140, from access node 120, a request for data traffic session 106 for UE 102. To accomplish this, access node 120 sends a create SM context request message 214 to session management node 140. In some examples, session management node 140 and access node 120 communicate over an N11 interface (e.g., connection 138).

Operation 312 includes determining, by session management node 140, a requested traffic type for the data traffic session, wherein the requested traffic type comprises a first traffic type or a second traffic type. Decision operation 314 includes determining whether session management node 140 is connected to a user plane function that can support requested traffic type 122. To accomplish this, access node 120 compares requested traffic type 122 with IP type 128. Operations 312 and 314 of FIG. 3 are shown as decision 216 in FIG. 2.

Session management node 140 supports IP type 128, which may be a first traffic type (e.g., IPv4) or a second traffic type (IPv6), based upon the IP type supported by the user plane function to which session management node 140 is connected. When session management node 140 is connected to user plane function 180*a*, which supports IP type 128*a*, IP type 128 is the same type as IP type 128*a*. When session management node 140 is connected to user plane function 180*b*, which supports IP type 128*b*, IP type 128 is the same type as IP type 128*b*. Thus, the support of session management node 140 for a particular IP type is derivative, based on the user plane function (user plane function 180*a* or user plane function 180*b*) to which session management node 140 is connected. IPv4 uses a 32-bit internet addresses, whereas IPv6 uses a 128-bit internet addresses to support a larger number of addresses. In some examples, IP type 128 indicates IPv4v6, meaning that session management node 140*a* is able to support both IPv4 and IPv6.

If requested traffic type 122 matches IP type 128, then requested traffic type 122 is supported, and flow chart moves to operation 316. Session management node 140 may then use the currently-connected user plane function, which in this example, is user plane function 180*a*. Operation 316 (not shown on FIG. 2) includes, based at least on determining that user plane function 180*a* can support requested traffic type 122, establishing requested data traffic session 106 for UE 102 using user plane function 180*a*. In this described example operation, however, requested traffic type 122 does not initially match IP type 128 (which is set to IP type 128*a*). For example, requested traffic type 122 may be IPv6, whereas IP type 128*a* is IPv4.

If decision operation 314 determines that user plane function 180*a* cannot support requested traffic type 122, operation 318 includes, receiving, by session management node 140, from network repository 160, identification of second user plane function 180*b*. Operation 318 enables session management node 140 to identify that second user plane function 180*b* is able to support requested traffic type 122. This may be accomplished, for example, by session management node 140 querying network repository 160 (e.g., using am NF discovery message) in message 217, and network repository 160 responding with a message 218 that identifies (e.g., in a list) that user plane function 180*b* supports requested traffic type 122. In some examples, identification of second user plane function 180*b* (by network repository 160) includes identifying which user plane functions can support which traffic types. In some examples, session management node 140 obtains the information that second user plane function 180*b* is able to support requested traffic type 122 in another manner (e.g., by session management node 140 querying second user plane function 180*b* and other user plane functions. Operation 320 includes, based at least on determining that user plane function 180*a* cannot support requested traffic type 122, connecting, by session management node 140, to user plane function 180*b* that can support requested traffic type 122. This may be accomplished by session management node 140 sending connect message 219 to user plane function 180*b*, which accepts the connection with accept message 220. In some examples, session management node 140 and user plane functions 180*a* and 180*b* communicate over an N4 interface, shown in FIG. 1 as connection 136*a* and connection 136*b*, respectively.

In decision operation 322 (accept decision 222 to create SM context request message 214 in FIG. 2), session management node 140 determines whether it can support requested data traffic session 106, using a connect logic 150. Possible reasons for session management node 140 to reject the request in message 214 include insufficient resources (reject reason #26, in some examples), user authentication or authorization failure (reject reason #29, in some examples), and others. However a rejection for unknown PDU session type (reject reason #28, in some examples) will not occur, because session management node 140 has connected to user plane function 180*b* that can support requested traffic type 122. If session management node 140 cannot support requested data traffic session 106, it issues a reject message (not shown in FIG. 2) and flow chart 300 then returns to operation 310. Access node 120 uses a retry logic 132 to try another session management node in operation 324. In some examples, retry logic 132 has a counter of a number of failed attempts before returning a rejection message to UE 102 and ceasing further attempts. In some examples, retry logic 132 has a timer to time-out each individual request before retrying with a different session management node. In some examples, retry logic 132 has a timer to time-out the total number of attempts before returning a rejection message to UE 102 and ceasing further attempts.

If, as shown in FIG. 2, session management node 140 can support requested data traffic session 106, at 326 session management node 140 responds to access node 120 with an accept response message 224 and access node 120 passes an accept response message 226 to UE 102. A session setup component 134 in access node 120 and a session setup component 154 in session management node 140 manage the establishment of data traffic session 106. Thus, operation 326 includes, based at least on connecting to user plane function 180*b*, establishing requested data traffic session 106 for UE 102 using user plane function 180*b*.

Figure 4:
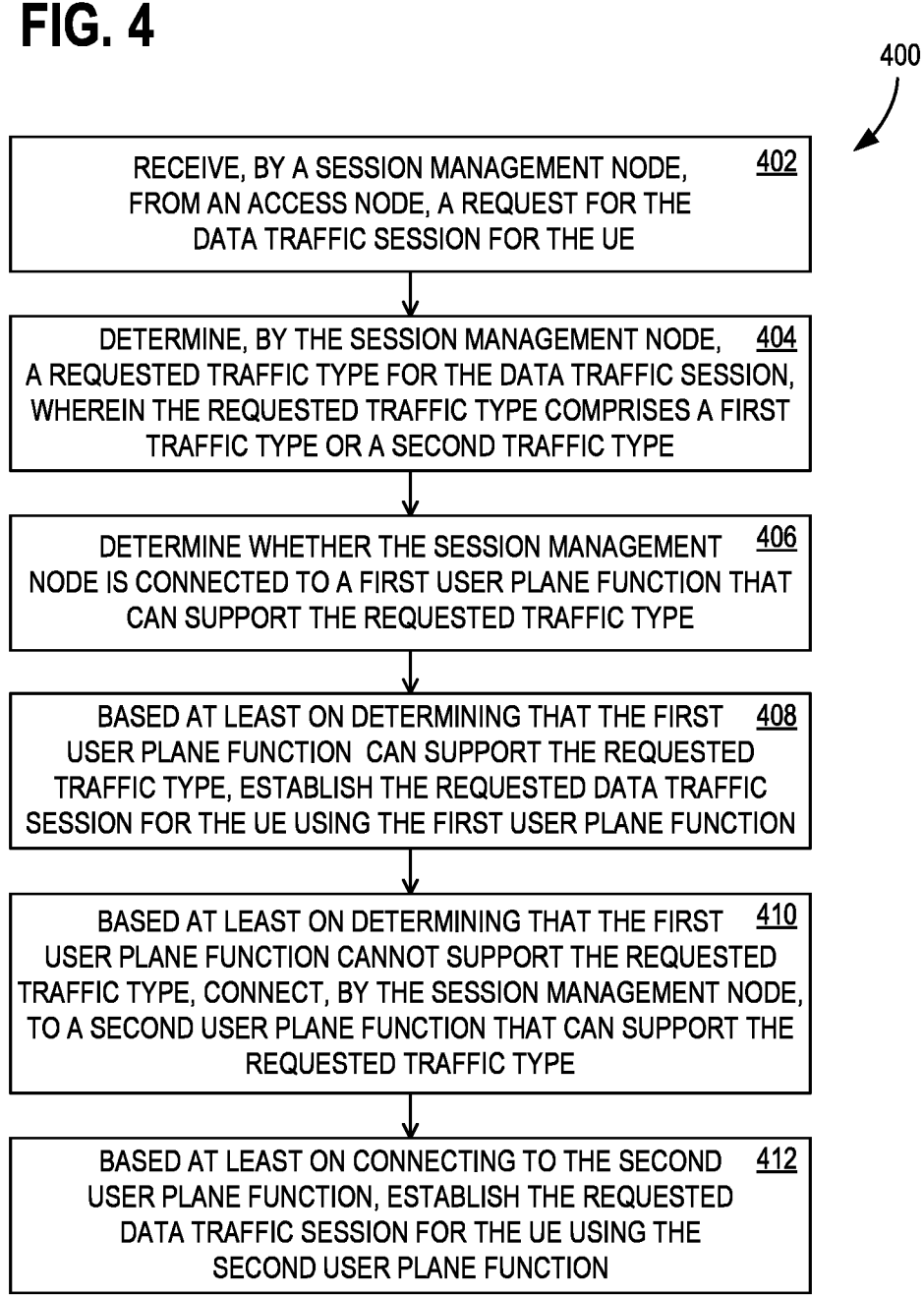
FIG. 4 illustrates another flow chart of exemplary operations associated with establishing a data traffic session for a UE on a network that advantageously employs dynamic UPF selection based on supported protocol type.

FIG. 4 illustrates a flow chart 400 of exemplary operations associated with establishing a data traffic session for a UE on a network. In some examples, at least a portion of flow chart 400 may be performed using one or more computing devices 500 of FIG. 5. Operation 402 includes receiving, by a session management node, from an access node, a request for the data traffic session for the UE. Operation 404 includes determining, by the session management node, a requested traffic type for the data traffic session, wherein the requested traffic type comprises a first traffic type or a second traffic type. Operation 406 includes determining whether the session management node is connected to a first user plane function that can support the requested traffic type. Operation 408 includes, based at least on determining that the first user plane function can support the requested traffic type, establishing the requested data traffic session for the UE using the first user plane function. Operation 410 includes, based at least on determining that the first user plane function cannot support the requested traffic type, connecting, by the session management node, to a second user plane function that can support the requested traffic type. Operation 412 includes, based at least on connecting to the second user plane function, establishing the requested data traffic session for the UE using the second user plane function.

Figure 5:
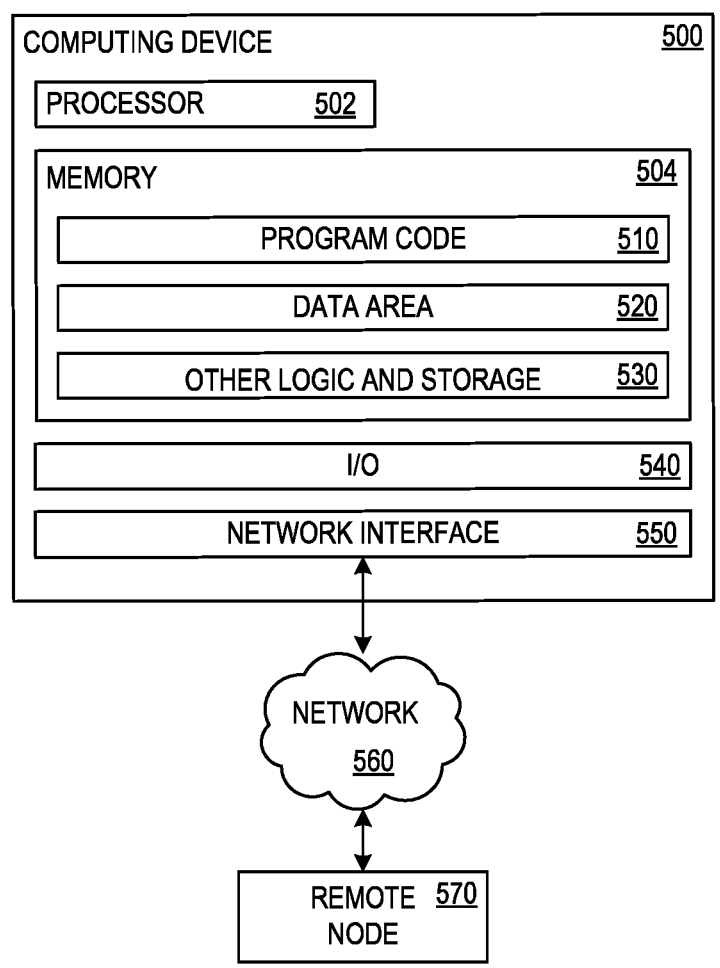
FIG. 5 illustrates a block diagram of a computing device that may be used as a component of the arrangement illustrated in FIG. 1.

FIG. 5 illustrates a block diagram of computing device 500 that may be used as a component of arrangement 100 of FIG. 1, for example, as a portion of UE 102, PDN 104, RAN 112, access node 120, session management node 140, network repository 160, user plane functions 180*a*, 180*b*, and 180*c*, and/or any other component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

Additional Examples

An exemplary system for establishing a data traffic session for a UE on a network comprises: a processor; and a computer-readable medium storing instructions that are operative upon execution by the processor to: receive, by a session management node, from an access node, a request for the data traffic session for the UE; determine, by the session management node, a requested traffic type for the data traffic session, wherein the requested traffic type comprises a first traffic type or a second traffic type; determine whether the session management node is connected to a first user plane function that can support the requested traffic type; based at least on determining that the first user plane function can support the requested traffic type, establish the requested data traffic session for the UE using the first user plane function; based at least on determining that the first user plane function cannot support the requested traffic type, connect, by the session management node, to a second user plane function that can support the requested traffic type; and based at least on connecting to the second user plane function, establish the requested data traffic session for the UE using the second user plane function.

An exemplary method of establishing a data traffic session for a UE comprises: receiving, by a session management node, from an access node, a request for the data traffic session for the UE; determining, by the session management node, a requested traffic type for the data traffic session, wherein the requested traffic type comprises a first traffic type or a second traffic type; determining whether the session management node is connected to a first user plane function that can support the requested traffic type; based at least on determining that the first user plane function can support the requested traffic type, establishing the requested data traffic session for the UE using the first user plane function; based at least on determining that the first user plane function cannot support the requested traffic type, connecting, by the session management node, to a second user plane function that can support the requested traffic type; and based at least on connecting to the second user plane function, establishing the requested data traffic session for the UE using the second user plane function.

One or more exemplary computer storage devices has computer-executable instructions stored thereon for establishing a data traffic for a UE on a network, which, on execution by a computer, cause the computer to perform operations comprising: receiving, by a session management node, from an access node, a request for the data traffic session for the UE; determining, by the session management node, a requested traffic type for the data traffic session, wherein the requested traffic type comprises a first traffic type or a second traffic type; determining whether the session management node is connected to a first user plane function that can support the requested traffic type; based at least on determining that the first user plane function can support the requested traffic type, establishing the requested data traffic session for the UE using the first user plane function; based at least on determining that the first user plane function cannot support the requested traffic type, connecting, by the session management node, to a second user plane function that can support the requested traffic type; and based at least on connecting to the second user plane function, establishing the requested data traffic session for the UE using the second user plane function.

Alternatively, or in addition to the other examples described herein, examples include any combination of the following:
the first traffic type comprises an IPv4 type;
the second traffic type comprises an IPv6 type;
registering, by the session management node, with the network repository;
registering, by the UE, with the access node;
receiving, by the access node, from the UE, a request for the data traffic session;
the request for the data traffic session from the UE identifies the requested traffic type;
the request for the data traffic session comprises a PDU Session Establishment Request;
receiving, by the access node, from a network repository, identification of the session management node;
receiving, by the session management node, from the network repository, identification of the second user plane function;
receiving, by the session management node, from the access node, a request for the data traffic session for the UE;
the access node comprises an AMF node;
the network repository comprises an NRF node;
the session management node comprises an SMF node;
the data traffic session comprises a PDU session;
the session management node and the user plane function communicate over an N4 interface; and
the session management node and the access node communicate over an N11 interface.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:
1. A method of establishing a data traffic session for a user equipment (UE) on a network, the method comprising:

receiving, by a session management node that is connected to a first user plane function, from an access node, a create request for the data traffic session for the UE;

determining, by the session management node, a requested traffic type for the data traffic session, wherein the requested traffic type comprises a first traffic type or a second traffic type;

based on receiving the create request, determining, by the session management node, whether the connected first user plane function can support the requested traffic type;

based at least on determining that the first user plane function can support the requested traffic type, establishing the requested data traffic session for the UE using the first user plane function;

based at least on determining that the first user plane function cannot support the requested traffic type, connecting, by the session management node, to a second user plane function that can support the requested traffic type; and based at least on connecting to the second user plane function, establishing the requested data traffic session for the UE using the second user plane function.

2. The method of claim 1, wherein the first traffic type comprises an internet protocol (IP) version 4 (IPv4) type, and the second traffic type comprises an IP version 6 (IPv6) type.

3. The method of claim 1, further comprising:
registering, by the session management node, with the network repository; and
registering, by the second user plane function, with the network repository, wherein registering, by the second user plane function, with the network repository comprises:
identifying, by the second user plane function, to the network repository, internet protocol (IP) traffic types supported by the second user plane function.

4. The method of claim 1, further comprising:
receiving, by the access node, from the UE, a request for the data traffic session, wherein the request for the data traffic session from the UE identifies the requested traffic type.

5. The method of claim 1,
wherein the session management node comprises a session management function (SMF) node;
wherein the access node comprises an access and mobility management function (AMF) node; and
wherein the data traffic session comprises a protocol data unit (PDU) session.

6. The method of claim 1, further comprising:
receiving, by the access node, from a network repository, identification of the session management node.

7. The method of claim 1, further comprising:
receiving, by the session management node, from a network repository, identification of the second user plane function.

8. The method of claim 7, wherein the network repository comprises a network function repository function (NRF) node.

9. The method of claim 1, wherein the session management node and the user plane function communicate over an N4 interface, and wherein the session management node and the access node communicate over an N11 interface.

10. A system for establishing a data traffic session for a user equipment (UE) on a network, the system comprising:
a processor; and
a computer-readable medium storing instructions that are operative upon execution by the processor to:
receive, by a session management node that is connected to a first user plane function, from an access node, a create request for the data traffic session for the UE;
determine, by the session management node, a requested traffic type for the data traffic session, wherein the requested traffic type comprises a first traffic type or a second traffic type;
based on receiving the create request, determine, by the session management node, whether the connected first user plane function can support the requested traffic type;
based at least on determining that the first user plane function can support the requested traffic type, establish the requested data traffic session for the UE using the first user plane function;
based at least on determining that the first user plane function cannot support the requested traffic type, connect, by the session management node, to a second user plane function that can support the requested traffic type; and
based at least on connecting to the second user plane function, establish the requested data traffic session for the UE using the second user plane function.

11. The system of claim 10, wherein the first traffic type comprises an internet protocol (IP) version 4 (IPv4) type, and the second traffic type comprises an IP version 6 (IPv6) type.

12. The system of claim 10, wherein the operations are further operative to:
register, by the session management node, with the network repository; and
register, by the second user plane function, with the network repository, wherein registering, by the second user plane function, with the network repository comprises:
identifying, by the second user plane function, to the network repository, internet protocol (IP) traffic types supported by the second user plane function.

13. The system of claim 10, wherein the operations are further operative to:
receiving, by the access node, from the UE, a request for the data traffic session, wherein the request for the data traffic session from the UE identifies the requested traffic type.

14. The system of claim 10,
wherein the session management node comprises a session management function (SMF) node;
wherein the access node comprises an access and mobility management function (AMF) node; and
wherein the data traffic session comprises a protocol data unit (PDU) session.

15. The system of claim 10, wherein the operations are further operative to:
receive, by the access node, from a network repository, identification of the session management node; and
receive, by the session management node, from the network repository, identification of the second user plane function.

16. The system of claim 15, wherein the network repository comprises a network function repository function (NRF) node.

17. The system of claim 10, wherein the session management node and the user plane function communicate over an N4 interface, and wherein the session management node and the access node communicate over an N11 interface.

18. One or more computer storage devices having computer-executable instructions stored thereon for establishing a data traffic session for a user equipment (UE) on a network, which, on execution by a computer, cause the computer to perform operations comprising:
  receiving, by a session management node that is connected to a first user plane function, from an access node, a create request for the data traffic session for the UE;
  determining, by the session management node, a requested traffic type for the data traffic session, wherein the requested traffic type comprises a first traffic type or a second traffic type;
  based on receiving the create request, determining, by the session management node, whether the connected first user plane function can support the requested traffic type;
  based at least on determining that the first user plane function can support the requested traffic type, establishing the requested data traffic session for the UE using the first user plane function;
  based at least on determining that the first user plane function cannot support the requested traffic type, connecting, by the session management node, to a second user plane function that can support the requested traffic type; and
  based at least on connecting to the second user plane function, establishing the requested data traffic session for the UE using the second user plane function.

19. The one or more computer storage devices of claim 18:
  wherein the first traffic type comprises an internet protocol (IP) version 4 (IPv4) type, and the second traffic type comprises an IP version 6 (IPv6) type;
  wherein the access node comprises an access and mobility management function (AMF) node;
  wherein the session management nodes comprise session management function (SMF) nodes;
  wherein the data traffic session comprises a protocol data unit (PDU) session;
  wherein the session management node and the user plane function communicate over an N4 interface; and
  wherein the session management node and the access node communicate over an N11 interface.

20. The one or more computer storage devices of claim 19, wherein the operations further comprise:
  receiving, by the session management node, from the access node, a request for the data traffic session for the UE;
  receiving, by the access node, from the UE, a request for the data traffic session, wherein the request for the data traffic session from the UE identifies the requested traffic type;
  receiving, by the access node, from a network repository, identification of the session management node, wherein the network repository comprises a network function repository function (NRF) node; and
  receiving, by the session management node, from the network repository, identification of the second user plane function.

\* \* \* \* \*